June 21, 1960
F. H. BRANDT
2,941,394
REINFORCING AND TENSIONING MEMBERS FOR CONCRETE STRUCTURES
Filed April 22, 1955
3 Sheets-Sheet 2
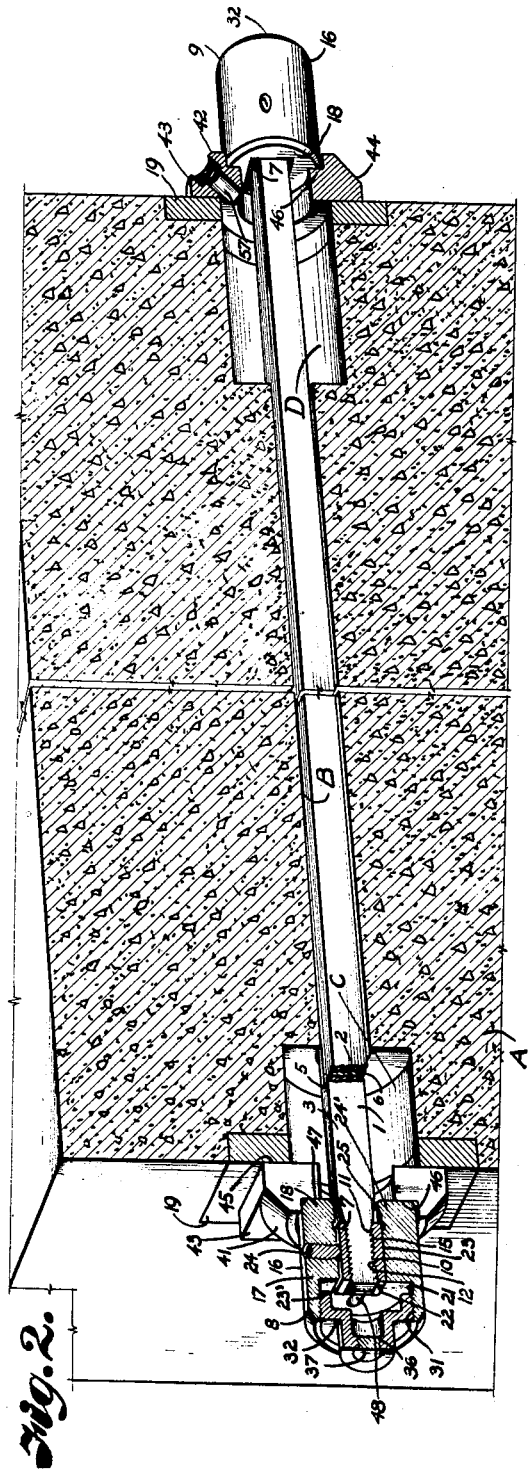
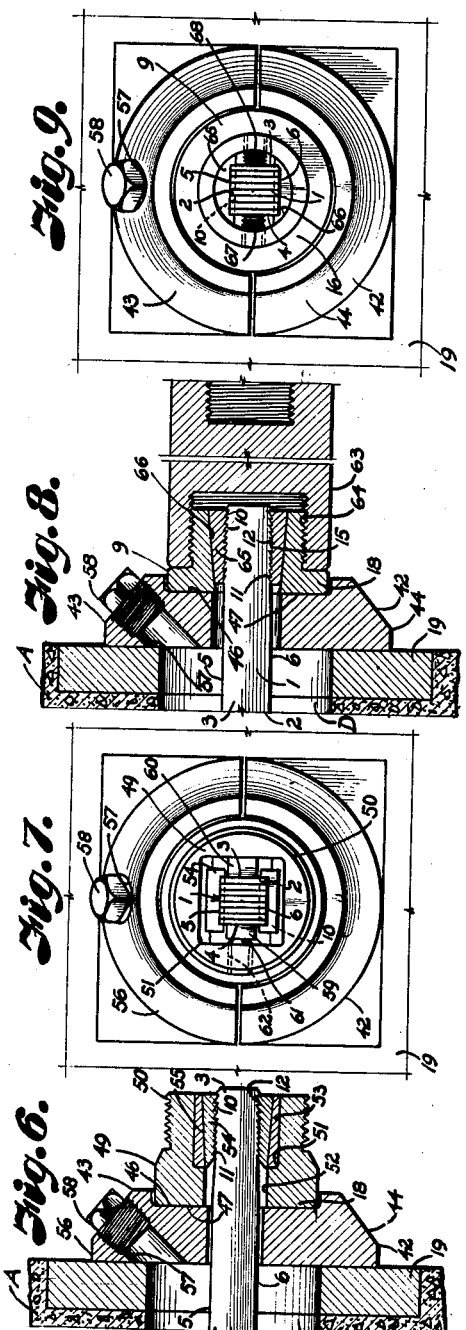
INVENTOR.
Fred H. Brandt.
BY
*Fishburn & Mullendore*
ATTORNEYS.

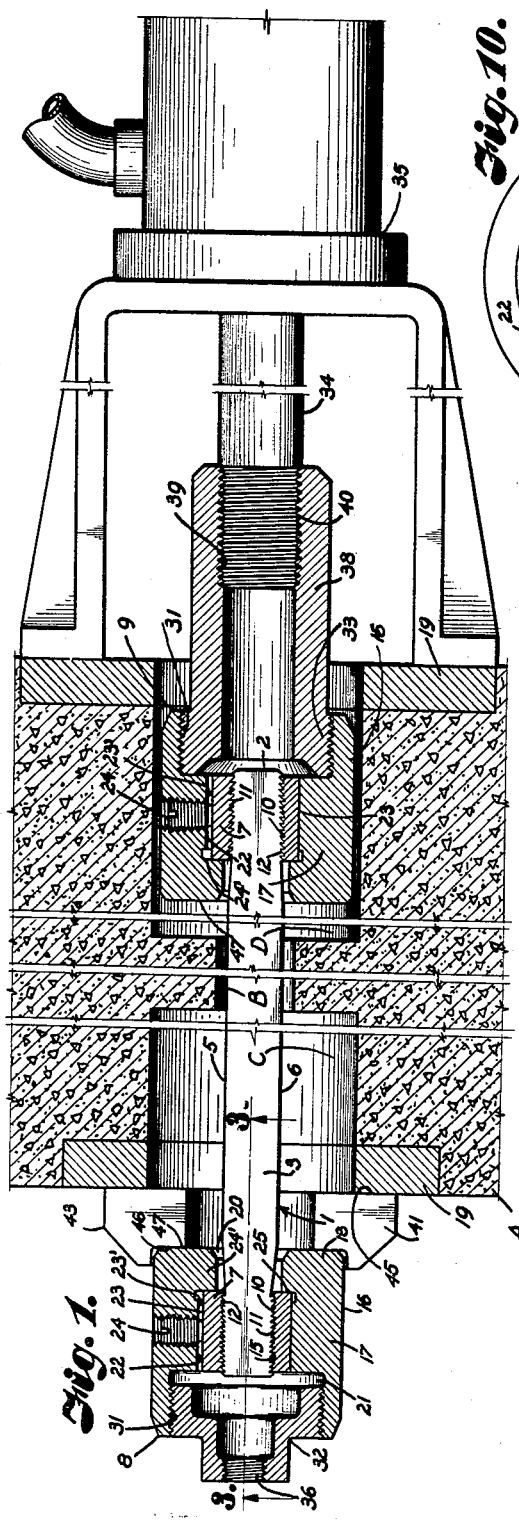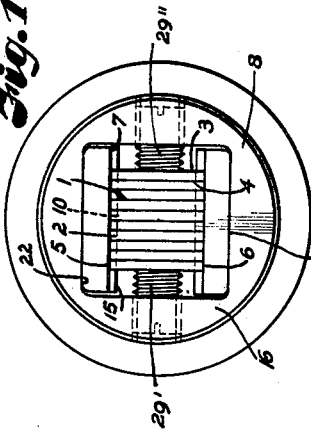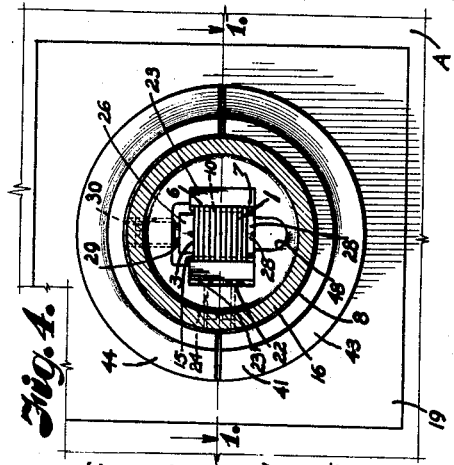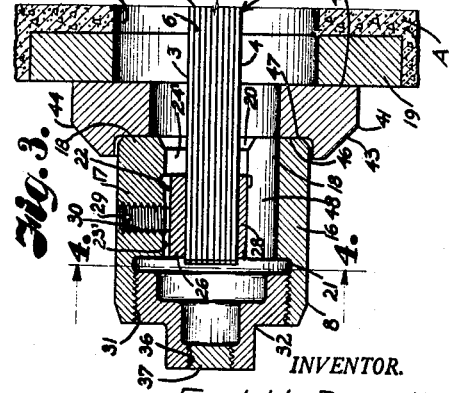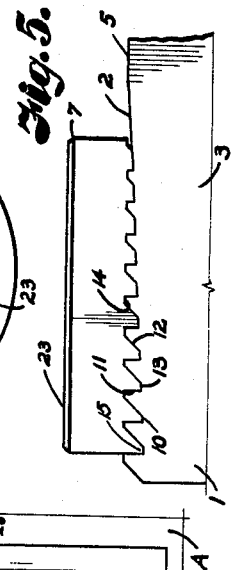
INVENTOR.
Fred H. Brandt.
BY
ATTORNEYS.

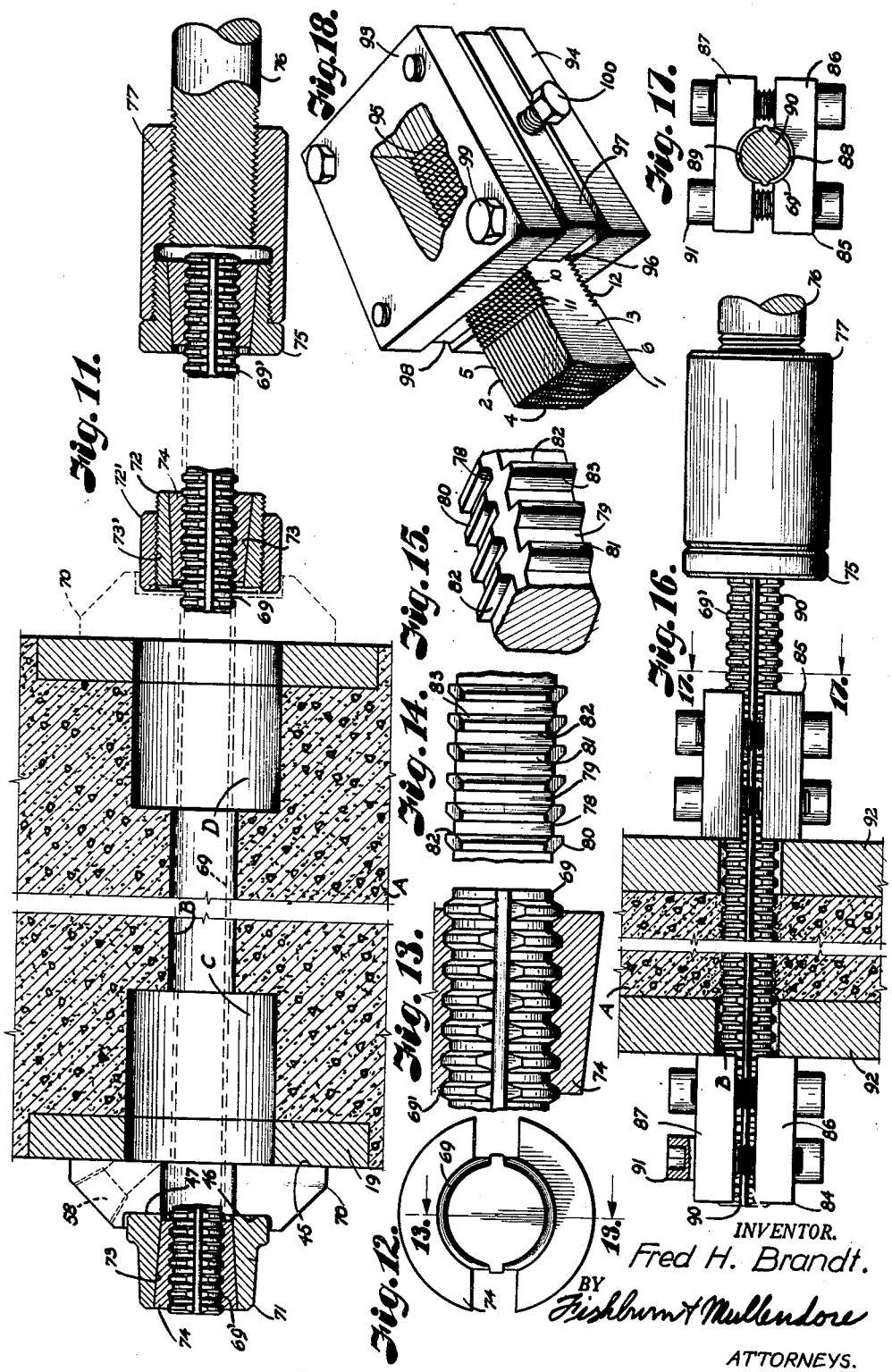

United States Patent Office 2,941,394
Patented June 21, 1960

2,941,394

REINFORCING AND TENSIONING MEMBERS FOR CONCRETE STRUCTURES

Fred H. Brandt, 6241 Agnes, Kansas City, Mo.

Filed Apr. 22, 1955, Ser. No. 503,111

4 Claims. (Cl. 72—110)

This invention relates to reinforcement for concrete structures, pre-cast members, composite members and the like, having a predetermined strength for safely supporting a given load and has for its principal object to provide reinforcement members of this character that are adapted to be post- or pretensioned.

Other objects of the invention are to provide reinforcing members, composed of a plurality of units wherein each unit comprises a ribbon or tape-like element and which may be arranged in face to face contact in sufficient number to form a composite reinforcement member adapted to sustain a given load as set out in the specifications for a given concrete structure; to provide anchors having gripping jaws or slips which cooperate with clamps in gripping the ends of the assembled units for holding the units in uniform tension when in use; to provide units that may be cut to length and the side edges thereof provided with serrations or teeth having a shape and arrangement to give an optimum strength when gripped by jaw elements of the anchors; to provide anchors wherein the position of the clamping elements is adjustable to adapt the anchors for the number of units which are required for a given load; and to provide anchors whereby the units are gripped substantially in the axis of the anchors regardless of the number of units to be employed in any one reinforcement member.

Other objects of the invention are to provide anchors which grip the deformations of a standard reinforcing rod, whereby standard reinforcing rods may be pre- or post-tensioned or high carbon or alloy steel rods for pre- or post-tensioning may be used for ordinary reinforcing purposes.

Other objects of the invention are to provide a solid reinforcing rod having deformations that may be rolled on side faces thereof in such shape and pattern so as to provide an optimum grip of the anchors when applied to the respective ends thereof.

In accomplishing these and other objects of the invention, I have provided improved structures, the preferred forms of which are illustrated in the accompanying drawings wherein:

Fig. 1 is a shortened longitudinal section of a concrete member and showing the application of a composite reinforcing member constructed in accordance with the present invention, and which has one end anchored and the other end connected with a hydraulic jack for applying a predetermined tension in the composite member for placing the concrete under compression.

Fig. 2 is the perspective section showing the anchors applied for permanently retaining the tension and preparatory to the injection of a cement grout for bonding the reinforcement member with the concrete, certain of the units composing the composite reinforcing member being broken away at one end thereof and the gripping head of one of the anchors being shown in sections to better illustrate the construction.

Fig. 3 is a fragmentary section through one of the anchors on the line 3—3 of Fig. 1.

Fig. 4 is a cross-section through the anchor on the line 4—4 of Fig. 3.

Fig. 5 is an enlarged fragmentary view of one of the gripping jaws or slips and end of a composite reinforcing member showing the shape and arrangement of the interengaging serrations to provide optimum grip and strength of the connection.

Fig. 6 is a fragmentary section showing a modified form of anchor.

Fig. 7 is an end view of the anchor shown in Fig. 6.

Fig. 8 is a further modified form of anchor.

Fig. 9 is an end view of the anchor illustrated in Fig. 8.

Fig. 10 is an end view of another form of anchor.

Fig. 11 is a longitudinal section of a concrete member and showing application of a new type of reinforcing rod, tensioned in accordance with the present invention.

Fig. 12 is an enlarged fragmentary end view of the reinforcing rod and slips which are used in the form of invention shown in Fig. 11.

Fig. 13 is a section on the line 13—13 of Fig. 12 with the rods being shown in elevation.

Fig. 14 is a fragmentary portion of a reinforcing rod equipped with deformations for establishing an optimum connection between the rod and jaws of the anchors.

Fig. 15 is a fragmentary perspective view of the rod shown in Fig. 14.

Fig. 16 is a longitudinal section through a concrete member showing application of a modified form of reinforcing rod and anchors therefor.

Fig. 17 is a cross-section on the line 17—17 of Fig. 16.

Fig. 18 is a perspective view of one end of a composite reinforcing member of the type shown in Figs. 1 to 10, inclusive, and showing a further modified form of anchor.

Referring more in detail to the drawings and first to the form of reinforcing member shown in Figs. 1 to 10, inclusive:

1 designates a composite reinforcing member which is composed of a plurality of units 2. Each unit 2 comprises an elongated strip of high carbon or alloy steel that is rolled or drawn to shape for providing substantially flat side faces 3 and 4 and narrower side edges 5 and 6. The units may be formed as a continuous ribbon having predetermined tensile strength so that the units may be cut to desired length for a given reinforcement member and used in desired number to give the combined strength of the reinforcement member which may be specified for supporting the load applied in a concrete member in which the reinforcement is to be used. The units 2 after being cut to uniform length, are placed face to face contact with the ends and side edges in registry and the ends clamped together to be gripped by jaws or slips 7 of anchor assemblies 8 and 9 at the respective ends of the concrete member in which the reinforcement is to be applied. In order to provide an optimum grip between the slips of the anchors and the side edges of the units, the side edges 5 and 6 of the units are provided with plurality of serrations 10 which are preferably shaped to provide faces 11 that are substantially at right angles to the axis of the unit and opposite faces 12 that slope from roots 13 of the serrations are flattened as indicated at 14. The flat faces 14 are substantially in alignment with the edges 5 and 6 of the units as best shown in Fig. 5. The root faces 13, however, are arranged to give the serrations a maximum depth at the outer ends of the units and a minimum depth which corresponds with the median line of the serrations as shown in Fig. 5. With this arrangement, the serrations 10 develop the optimum strength for supporting the shear load that is applied thereto when the units are under tension as later described. The jaws or slips 7 have serrations 15 complementary to the space between the serrations 10 of the units and are of a transverse width sufficient to engage all of the units that are to be used in the composite reinforcement. The jaws or slips are of sufficient length to give the desired gripping area on the edge of the units and are of a thickness to give the desired strength under the forces which are applied thereto to maintain the serrations 15 of the jaws or slips in engagement with the serrations 10 on the units.

The anchors include heads 16 which may be cylindrical having an overall diameter sufficient to accommodate the jaws or slips and provide the desired thickness of the wall 17 thereof as well as seating area 18 of the head on bearing plates 19 of the anchors. Each head 16 has an axial opening 20 of suitable size and shape to pass the ends of the reinforcing member while the opposite end has stepped counterbores 21 and 22, the inner of which has a cross-sectional shape corresponding to the cross-section of the jaws or slips 7. For example, where the jaws or slips have flat outer faces 23, the counterbores 22 are rectangular as shown in the drawings and are of a width to freely accommodate the jaws or slips 7 therein and to provide a slight clearance as indicated at 23' whereby the serrated end of the units 2 may be inserted into the heads of the anchors to be engaged with the jaws. The heads also have adjusting screws 24 threaded into the wall of the head and engaging one of the jaws to tighten the jaws on the strips. In any event, the jaws or slips are of a size relatively to the opening 20 to leave a ledge or shoulder 24' against which the end face 25 of the jaws or slips are adapted to rest.

Located intermediate the jaws and seating on one side of the recess are one or more shims 26 which cooperate with a pressure plate 28 that is movable in the opposite side of the counterbore or recess 22 responsive to an adjusting screw 29 that is threaded in an opening 30 in the side wall of the head 16 as best shown in Figs. 3 and 4 whereby the strip units are clamped against each other and against the shim 26 to prevent independent movement or a lateral shifting of the respective units. The counterbore or recess 21 is internally threaded as at 31 for reception of a closure plug 32, or a jack connecting plug 33 by which the piston 34 of a jack 35 is connected. The closure plug 32 has a central threaded opening 36 which is adapted to be closed by a plug 37. The opening 36 forms a port through which grout can be injected through one of the anchors as later described.

The connecting plug 33 includes a sleeve 38 having an internally threaded bore 39 for engaging the threads 40 of the rod 34 of the jack.

The bearing plates 19 may be set in the form in which the concrete is poured, thereby providing abutments for spacing members 41 and 42 for the respective anchors. The spacing members are of like construction and each includes mated sections 43 and 44 which are adapted to surround the composite reinforcing member and which have flat inner faces 45 adapted to seat against the bearing plates 19 while their outer sides are provided with annular shoulders 46 to set the end faces 47 of the anchor heads when the anchors are used at later described.

The interior of each gripping head has a passageway 48 for grout when the grout is injected through the opening 36, so that the grout passes around the jaws or slips 7 through the openings of the spacing members and through the openings of the bearing plates.

In the form of the invention shown in Fig. 6 the gripping head 49 includes an externally threaded periphery 50 that is adapted to connect with the rod of the hydraulic jack or with the closure cap, not shown. In this form of the invention, the inner side of the head has recesses 51 of larger size than the openings 52 which pass the ends of the reinforcing member for seating tapered backing plates 53 and which are adapted to seat the gripping jaws or slips 54. The jaws or plates 54 have serrations corresponding with the serrations of the slips or gripping jaws previously described but which have tapering backs 55 to cooperate with the backing plates in wedging the jaws in gripping contact with the edges of the strips when the strips are under tension. In this form of the invention one of the spacer sections 56 has an opening 57 through which the grout is injected and which is normally closed by a plug 58. In this form of the invention the strips are clamped together between clamping blocks 59 and 60, one of which sets against a side of the recess at a point intermediate the slips 54 and the other is urged into clamping contact with the ends of the strips by an adjusting screw 61 which is threaded through an opening 62 in the side wall of the gripping head 49. In this form of the invention the coupling 63 for the jack has an internally threaded end 64 for engaging the threads of the gripping head as shown in Fig. 8.

The form of jaws or slips 65 illustrated in Fig. 8 are similar to those illustrated in Fig. 6 with the exception that they seat within a tapered annular bore 66 formed directly within the gripping head. In this case, the outer surface of the jaws or slips are arcuate and tapered in corresponding relation with the tapered bore of the gripping head. The clamping lugs may be omitted, in which case adjusting screws 67 and 68 are applied in threaded openings on opposite sides of the gripping head as best shown in Fig. 9.

Fig. 10 shows an anchor similar to the structure shown in Figs. 1 to 4 with the exception that the strips 2 are clamped together between set screws 29' and 29''.

In the form of invention shown in Fig. 11, a solid reinforcing rod 69 may be used and which has a plurality of spaced circular deformations or serrations 69'. In this instance the spacing plates 70 correspond with the spacing plates previously described. However, the gripping heads 71 and 72 have internally tapered bores 73 for seating tapered slips 74. Also in this instance, a separate gripping head 75 having the same construction as the gripping heads 71 and 72 is used to connect with the rod 76 of the jack by means of a sleeve connector 77. The rods used in this form of invention are preferably formed of high carbon or alloy steel so as to adequately maintain the forces necessary in applying compression to the structure reinforced thereby.

In order to compensate for any variation in length of the reinforcing members and placement of the gripping jaws, the head 72 may be provided with external threads 73' for adjustably mounting an internally threaded sleeve 72' thereon. For example, if a sufficient amount of tension is not effected when the gripping head is seated, the tension may be increased by turning the collar on the head until it projects therefrom a sufficient distance so that when it engages the spacers the desired tension is effected in the reinforcing member.

The form of rod illustrated in Figs. 14 and 15 is of substantially rectangular cross-section and the respective opposite sides 78 and 79 have transverse deformations or serrations 80 and 81. The deformations 80 and 81 have face sides 82 which are located in planes at right angles to the longitudinal axis of the rod and the opposite faces 83 are formed at an incline. The deformations 80 on the opposite sides of the rod are similar but the straight side faces thereof are reversely arranged.

The deformations are thus shaped to approach the outline of either a stub thread form as shown in Fig. 13 or the load bearing thread form as shown in Figs. 14 and 15. In the latter construction the slips at one end of the rod engage one set of deformations and the slips at the other end engage the other or opposing deformations whereby the direct pull applied by tensions acts squarely upon the faces 82 of the respective deformations.

The form of invention illustrated in Fig. 16 utilizes clamps 84 and 85. Each clamp includes a pair of plates 86 and 87 having transverse grooves 88 and 89 in the facing sides thereof and which correspond in shape to the deformations on the rod 90. The plates are held together by fastening devices such as cap screws 91 having threaded shanks passing through slightly elongated openings in one of the plates and into threaded openings in the other plate allowing for the plates to seat on the bearing plates 92. The clamping screws are preferably located on opposite sides of the rod with certain of the clamping screws inserted in opposite directions.

The form of clamp illustrated in Fig. 18 comprises plates 93 and 94 having serrations 95 and 96 on facing sides thereof for engaging the serrations of the reinforcing member. The plates are spaced apart to accommodate the ends of the reinforcing members therebetween by spacers 97 and 98, the parts being held in assembly by fastening devices such as screws 99 that extend through openings in the corners of the plates and through registering openings in the ends of the spacers. The strips composing the reinforcing member are clamped against one of the spacers and against each other by a set screw 100 that is threaded through the opposite spacer.

In using the form of invention shown in Fig. 1, a concrete structure to be formed, for example, a beam "A" is provided with a longitudinal opening "B" of ample size to accommodate the cross-sectional size of the strip units composing the reinforcing member. The ends of the concrete member may be provided with recesses "C" and "D" which are of slightly larger diameter than the external diameter of the gripping heads whereby the gripping heads may be received therein when assembling the reinforcing members and anchors as later described. The opening "B" and the recesses "C" and "D" may be provided within the beam member by using a collapsible core of the desired cross-section so that the core may be readily removed after setting of the concrete. In casting the beam, a form (not shown) is necessary to provide a beam of the desired shape, and the bearing plates 19 may be set into the inter-ends of the form in coaxial relation with the ends of the collapsible core. The core is preferably positioned in the form somewhat in the form of a catenary, depending upon the length of the beam, while the outer ends are supported substantially coaxially within the openings of the plates 19.

After pouring of the concrete, the concrete is allowed to set and cure, after which the form and core are removed leaving the passageway "B" and the open recesses "C" and "D."

The strip units 2 composing the reinforcing member are cut to proper length to produce the desired compression on the concrete and the strips 2 are selected in sufficient width, thickness and number to provide the required strength for the assembled reinforcing member. The reinforcing units 2 may be temporarily held together in a bundle with the side faces thereof in contact and with the ends in registry so that the serrations in the edges thereof register for accommodating the teeth of the jaws or slips. The reinforcing member composed of the strip units 2 is then inserted through the opening "B" allowing one end to project for mounting one of the gripping heads, for example, the head 16 of the anchor assembly 8 is sleeved over the projecting end with the slips or jaws 7 therein sliding over the serrations 10. When in position, the serrations 10 and 15 interengage. The shims 26 were inserted in proper number to maintain coaxial registry of the bundle of strip units 2 with the gripping engagement with the serrations of the units 2 of the reinforcing member. The plug 37 may then be applied together with the closure plug 32, after which the gripping head is moved into the recess "C" to project the opposite end of the reinforcing member from the recess "D." The gripping head for the anchor assembly 9 at that end is applied in like manner and the coupling 33 is connected to the rod 34 of the jack 35. The entire assembly is then shifted in the opposite direction to again project the gripping head which was first applied to permit insertion of the spacers 41 between the bearing plate 19 and the gripping head. This moves the other gripping head into the recess "D." The reinforcing member is now ready to be tensioned upon actuation of the jack which draws the gripping head that is connected therewith from the recess "D" a sufficient distance to allow placement of the spacers 42 for that end of the beam. Then when the pressure is released from the jack, the gripping head at that end sets thereagainst to hold the established tension in the composite reinforcing member. The coupling 33 is then removed to permit removal of the jack after which a plug 32 is applied to the gripping head at that end of the beam. In this instance, the small plug 37 is removed to permit connection of a suitable tool through which a grout is injected through the anchor to fill the longitudinal opening "B" and the recesses "C" and "D" surrounding the composite reinforcing member. The forms of the invention shown in Figs. 6, 8 and 10, are applied in like manner for holding the tension in the composite reinforcing member of the type just described. When a solid reinforcing rod 69 is used, as shown in Fig. 11, the rod is cut in proper length, placed within the longitudinal opening "B" of the beam after which the gripping head 71 is sleeved over one end of the rod and moved retractively a sufficient distance thereon to permit application of the gripping jaws or slips to the end of the rod 69 with the serrations thereon engaging the serrations of the rods as shown in Fig. 11. The rod with the slips assembled thereon is then pushed into the gripping head so that the jaws or slips enter the tapered bore 73 thereof with sufficient force so that the taper of the jaws wedge within the taper of the gripping head. In this position the opposite end of the rod projects to allow for similar application of gripping head at that end, one providing an anchor and the other providing a connection for the hydraulic jack. The rod is then moved in the opposite direction to bring the first applied gripping head out of the recess "C" in that end of the beam and to permit insertion of the spacers 70 between the gripping head and the bearing plate 19. This moves the gripping head at the other end into the recess "D" whereupon the jack is operated to apply tension in the rod and draw the gripping head 72 from the recess "D" and allow sufficient space for applying the spacers 70 at that end of the beam. After the spacers 70 are in place, the jack is eased off to allow setting of the gripping head on the bearing plate. The jack is then uncoupled from the rod and the rod may be cut off near the outer end of the gripping head. In this instance, the grout may be applied through the opening 57 in one of the spacers after which the opening is closed by a suitable plug, as shown.

The reinforcing rod shown in Figs. 14 and 15 is used in the same manner as the rod just described. However, in this instance the slips 74 of one anchor 71 are applied to the ribs or deformations 69' on opposite sides of the rod while the slips of the other gripping head are applied to the other ribs or deformations 69' on the other sides of the rod.

The form of invention shown in Fig. 16, which includes the anchor clamps 84 and 85, is applied by inserting a rod 90 through the opening "B" in the beam with the rod being positioned so that one end projects sufficiently to apply the clamping clamp 84 in that end. The reinforcing rod is then shifted so that the ends of the clamp 84 seat against the bearing plate 92 of the beam after which the coupling 77 for the jack 35 is engaged with a gripping head of the type as shown in Fig. 11. The rod is then tensioned to provide the desired compression on the beam after which a clamp 85 is applied and secured to the rod as shown in Fig. 16. Upon release of the jack, the clamps maintain the tension to establish the desired compression in the beam. If desired, the projecting end of the rod to which the jack was connected may be cut off at a point adjacent the clamp 85.

It is obvious that all the forms of the invention may be used in similar manner. When the apparatus is used for pre-tensioning of the reinforcing members the method of installation and operation is the same with the exception that the forms in which the concrete is to be poured serve as the bearing plates. The reinforcing members and anchors are applied and the reinforcing members are tensioned between the ends of the form by means of a jack mechanism which is supported against one end of the form and secured to an anchor at that end to pull tension in the reinforcing member after which an anchor is placed against the end of the form on which the jack bears and an anchor is placed on the reinforcement member to contact the form when the jack is released. The form is then filled with concrete and after the concrete is set, the anchors and the forms are removed, since it is obvious that tension of the reinforcing member is retained by the bonding action between the concrete and the serrations on the reinforcing member to keep the concrete under compression. After removal of the anchors and forms, the projecting ends of the reinforcing members may be cut off at any distance from the face of the concrete that is desired.

What I claim and desired to secure by Letters Patent is:

1. A reinforcement for maintaining a structural member under compression, said reinforcement including a plurality of flat strips in a number to provide the desired size of reinforcement necessary, said strips having the flat faces thereon in face to face contact and having serrated edges at the ends of said strips with the serrations of said edges of the respective strips being in transverse registry, and anchoring means for the ends of said strips including jaw means having serrations engaging the serrations on opposite edges of the strips to grip the strips in an edgewise direction for retaining all of the strips in coextensive registry, clamp means at face sides of the outermost strips and interposed between said jaw means for clamping the ends of the strips together in a facewise direction, and means for securing the clamping means relatively to the jaw means in the longitudinal direction of said strips.

2. A reinforcement including a plurality of strips to provide a necessary cross sectional area, said strips having face to face contact and having serrated edges at ends of the strips with the serrations of one strip being in side to side registration with the serrations of another of said strips, jaw means having serrations interengaging the serrations in the edges of said strips, and clamp means engaging outer faces of the outermost of said strips to clamp the strips therebetween in said face to face contact.

3. A reinforcement including a plurality of strips to provide a necessary cross sectional area, said strips having face to face contact and having serrated edges at ends of the strips with the serrations of one strip being in side to side registration with the serrations of another of said strips, jaw means having serrations interengaging the serrations in the edges of the strips, clamp means engaging outer faces of the outermost of said strips to clamp the strips therebetween in said face to face contact, and means for retaining the clamp means fixed relatively to the jaw means in the longitudinal direction of said strips.

4. A reinforcement as described in claim 1, wherein the jaw means have tapering backs and the means for securing the clamp means relatively to the jaw means have tapering seats for the tapering backs of the jaw means.

References Cited in the file of this patent

UNITED STATES PATENTS

| | | |
|---|---|---|
| 845,763 | Curlett | Mar. 5, 1907 |
| 1,535,293 | Collins | Apr. 28, 1925 |
| 2,357,171 | Carlson | Aug. 29, 1944 |
| 2,737,802 | Bakker | Mar. 13, 1956 |
| 2,827,770 | Bakker | Mar. 25, 1958 |

FOREIGN PATENTS

| | | |
|---|---|---|
| 166,560 | Austria | Aug. 25, 1950 |
| 299,630 | Switzerland | Sept. 1, 1954 |
| 569,729 | Great Britain | June 6, 1945 |
| 642,589 | Great Britain | Sept. 6, 1950 |
| 694,596 | Great Britain | July 22, 1953 |
| 705,073 | Great Britain | Mar. 10, 1954 |
| 897,321 | Germany | Nov. 19, 1953 |
| 1,046,484 | France | July 8, 1953 |